United States Patent
Nakamoto et al.

(10) Patent No.: US 10,336,375 B2
(45) Date of Patent: Jul. 2, 2019

(54) PILLAR STRUCTURE

(71) Applicant: TOYOTA JIDOSHA KABUSHIKI KAISHA, Toyota-shi, Aichi-ken (JP)

(72) Inventors: Yoshiaki Nakamoto, Nisshin (JP); Naohiko Ueno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 15/837,394

(22) Filed: Dec. 11, 2017

(65) Prior Publication Data

US 2018/0170443 A1    Jun. 21, 2018

(30) Foreign Application Priority Data

Dec. 19, 2016    (JP) .................................. 2016-246502

(51) Int. Cl.
| | | |
|---|---|---|
| *B60N 99/00* | (2006.01) | |
| *B62D 25/04* | (2006.01) | |
| *B62D 29/00* | (2006.01) | |

(52) U.S. Cl.
CPC ........... *B62D 25/04* (2013.01); *B62D 29/007* (2013.01)

(58) Field of Classification Search
CPC ............................... B62D 25/04; B62D 29/007
See application file for complete search history.

(56) References Cited

U.S. PATENT DOCUMENTS

| | | |
|---|---|---|
| 6,279,990 B1 | 8/2001 | Miyasaka et al. |
| 6,702,368 B1 | 3/2004 | Hanyu |
| 2008/0211264 A1 | 9/2008 | Riess et al. |
| 2010/0133877 A1* | 6/2010 | Mori ....................... B23K 26/24 296/187.12 |
| 2014/0008938 A1 | 1/2014 | Busch et al. |
| 2015/0175218 A1* | 6/2015 | Yoshioka ............. B62D 25/025 296/203.01 |
| 2015/0360725 A1* | 12/2015 | Yoshida ............... B62D 21/157 296/203.01 |
| 2016/0023683 A1* | 1/2016 | Nishimura ............. B62D 25/02 296/187.12 |
| 2016/0362141 A1* | 12/2016 | Hasegawa ............ B62D 21/157 |
| 2018/0065680 A1* | 3/2018 | Kamimura .............. B60R 22/34 |

FOREIGN PATENT DOCUMENTS

| | | |
|---|---|---|
| EP | 1 912 849 B1 | 2/2010 |
| JP | 2001-163257 A | 6/2001 |
| JP | 3610952 B2 | 1/2005 |
| JP | 2010-076763 A | 4/2010 |
| JP | 2014094636 A * | 5/2014 |
| JP | 2016-043780 A | 4/2016 |

* cited by examiner

*Primary Examiner* — Lori L Lyjak
(74) *Attorney, Agent, or Firm* — Oliff PLC (57) ABSTRACT

A pillar structure includes: a pillar inner panel; and an outer reinforcement including a flange portion welded to the pillar inner panel, an outer portion located at a more vehicle-outward position than the flange portion and having a thicknesses that varies in the up-down direction of the vehicle, and a coupling portion coupling the flange portion to the outer portion. The outer reinforcement has a plate-thickness gradual change region where a thickness of the outer reinforcement gradually changes in the front-rear direction of the vehicle such that a thickness of the flange portion becomes equal to or less than a thickness of the thick-plate region between a thick-plate region where a thickness of the outer portion is more than a predetermined thickness and the flange portion.

6 Claims, 8 Drawing Sheets

PILLAR STRUCTURE

INCORPORATION BY REFERENCE

The disclosure of Japanese Patent Application No. 2016-246052 filed on Dec. 19, 2016 including the specification, drawings and abstract is incorporated herein by reference in its entirety.

BACKGROUND

1. Technical Field

The present disclosure relates to a pillar structure of a vehicle.

2. Description of Related Art

EP Patent No. 1912849 discloses a configuration of an outer reinforcement of a center pillar having different thicknesses in the up-down direction of the vehicle. In the center pillar in EP Patent No. 1912849, end portions thereof in the up-down direction of the vehicle have thinner plate thicknesses, and an intermediate portion thereof in the up-down direction of the vehicle has a thicker thickness. In this manner, respective regions in the up-down direction of the vehicle have different thicknesses that are changed depending on the required strengths thereof, to thereby reduce a thickness of a portion where a great strength is not required, while securing required strength, thus promoting weight reduction of the center pillar.

Meanwhile, a center pillar is configured by joining an outer reinforcement to a pillar inner panel. The outer reinforcement is joined to the pillar inner panel via welding or the like with their respective end portions in the shorter-length direction overlaid with each other. However, if a total thickness of the both thicknesses is thicker when they are overlaid, it makes more difficult to carry out the welding.

SUMMARY

The present disclosure provides a pillar structure that can facilitate welding between an outer reinforcement and a pillar inner panel, while securing required strength.

An aspect of the present disclosure provides a pillar structure. The pillar structure includes: a pillar inner panel extending in an up-down direction of the vehicle at a side part of a vehicle; and an outer reinforcement. The outer reinforcement includes a flange portion located at a more vehicle-outward position than the pillar inner panel and welded to the pillar inner panel, an outer portion located at a more vehicle-outward position than the flange portion, and coupling portion coupling the flange portion to the outer portion. The outer portion has a thickness that varies in the up-down direction of the vehicle. The outer reinforcement forms a closed cross section with the pillar inner panel. The outer reinforcement has a plate-thickness gradual change region where the thickness of the outer reinforcement gradually changes in the front-rear direction of the vehicle such that a thickness of the flange portion becomes equal to or less than a thickness of the thick-plate region between a thick-plate region where a thickness of the outer portion is more than a predetermined thickness and the flange portion.

According to this aspect, even in the part where the outer portion has a thicker thickness, the thickness of the flange portion in this part is not more than the predetermined thickness; therefore, it is possible to set the thickness of the joined portion to the pillar inner panel to be not more than the predetermined thickness that is suitable for the welding. It is also possible to secure required strength for the outer portion.

In this aspect, the coupling portion may be flat, and may include the plate-thickness gradual change region. In the plate-thickness gradual change region, a thickness of the coupling portion may gradually reduce from a first end of the coupling portion on a side of the outer portion toward a second end of the coupling portion on a side of the flange portion.

According to this aspect, the displacement of the coupling portion in the plate-thickness gradual change region from the outer portion to the flange portion is moderated, and thus it is possible to suppress stress concentration at the time of a collision. In addition, by suppressing the stress concentration at the collision time, it is possible to enhance an energy absorption performance.

In this aspect, the thickness of the flange portion may be constant in the front-rear direction of the vehicle.

According to this aspect, since the thickness in the front-rear direction of the vehicle of the flange portion is constant, it is possible to easily adjust heat input during the welding. In addition, heat input can be easily adjusted, and thus it is possible to easily weld the outer reinforcement and the pillar inner panel to each other.

In this aspect, the outer reinforcement may be composed of a single high tensile steel plate.

According to this aspect, it is possible to easily produce the outer portion including different thickness portions. Furthermore, it is possible to easily produce the outer reinforcement.

In this aspect, the thick-plate region may include a center of the outer reinforcement in the up-down direction of the vehicle.

In this aspect, the outer portion may have the plate-thickness gradual change region.

As aforementioned, according to the pillar structure of the present disclosure, it is possible to facilitate welding between the outer reinforcement and the pillar inner panel, while securing required strength.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, the first embodiment of a vehicle side structure according to the present disclosure will be described with reference to FIG. 1 to FIG. 4. As appropriately shown in each drawing, an arrow FR indicates a vehicle-frontward direction (a traveling direction), and an arrow UP indicates a vehicle-upward direction, and an arrow OUT indicates an outward direction in a vehicle-width direction. Hereinafter, when description is provided by using simply the frontward-rearward, vertical, and leftward-rightward directions, they mean the front-rear of the front-rear direction of the vehicle, the up-down of the up-down direction of the vehicle, and the left-right of the vehicle-width direction when facing in the traveling direction, unless otherwise stated. Each mark x in the drawing indicates a position where a spot-welding is carried out.

Figure 1:
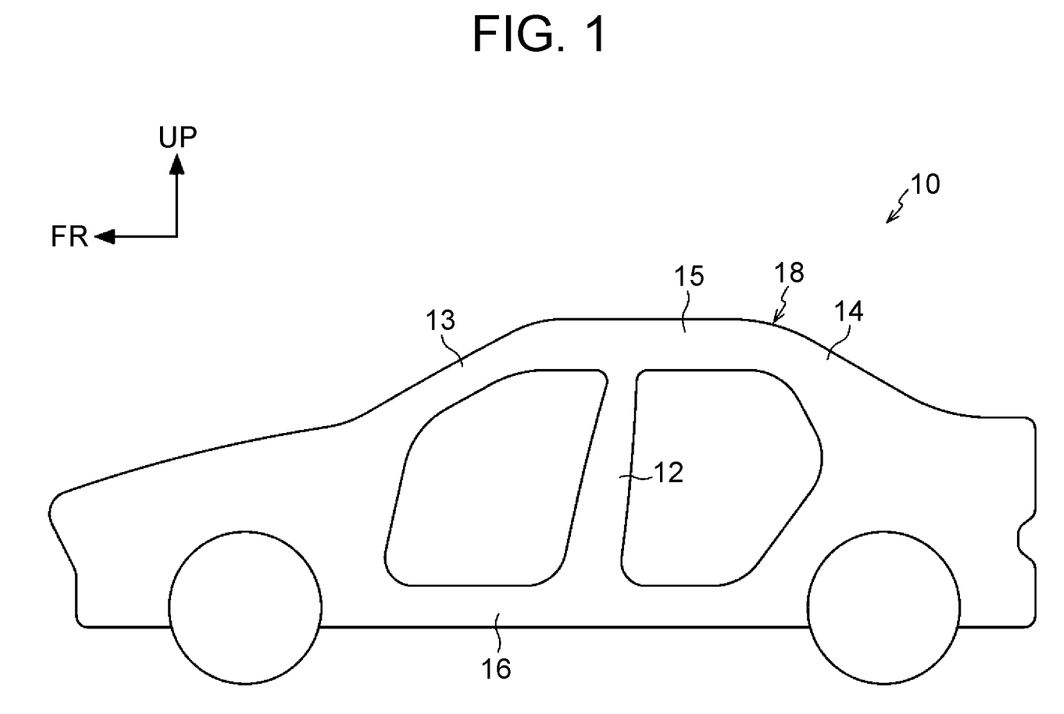
FIG. 1 is a side view of a vehicle to which a center pillar according to the first embodiment is applied.

FIG. 1 shows a schematic view of a vehicle 10. The vehicle 10 is shown in FIG. 1. The vehicle 10 has a vehicle body 18 that includes center pillars 12, front pillars 13, rear pillars 14, roof side rails 15, and lockers 16.

Each center pillar 12 is provided at a side part of the vehicle in a manner as to extend in the vertical direction. Each front pillar 13 is provided at a more frontward position than each center pillar 12, each rear pillar 14 is provided at a more rearward position than each center pillar 12. Each roof side rail 15 is provided to extend in the front-rear direction of the vehicle at a vehicle-upper position of the vehicle body 18. Each locker 16 is provided to extend in the front-rear direction of the vehicle at a vehicle-lower position of the vehicle body 18.

Figure 2:
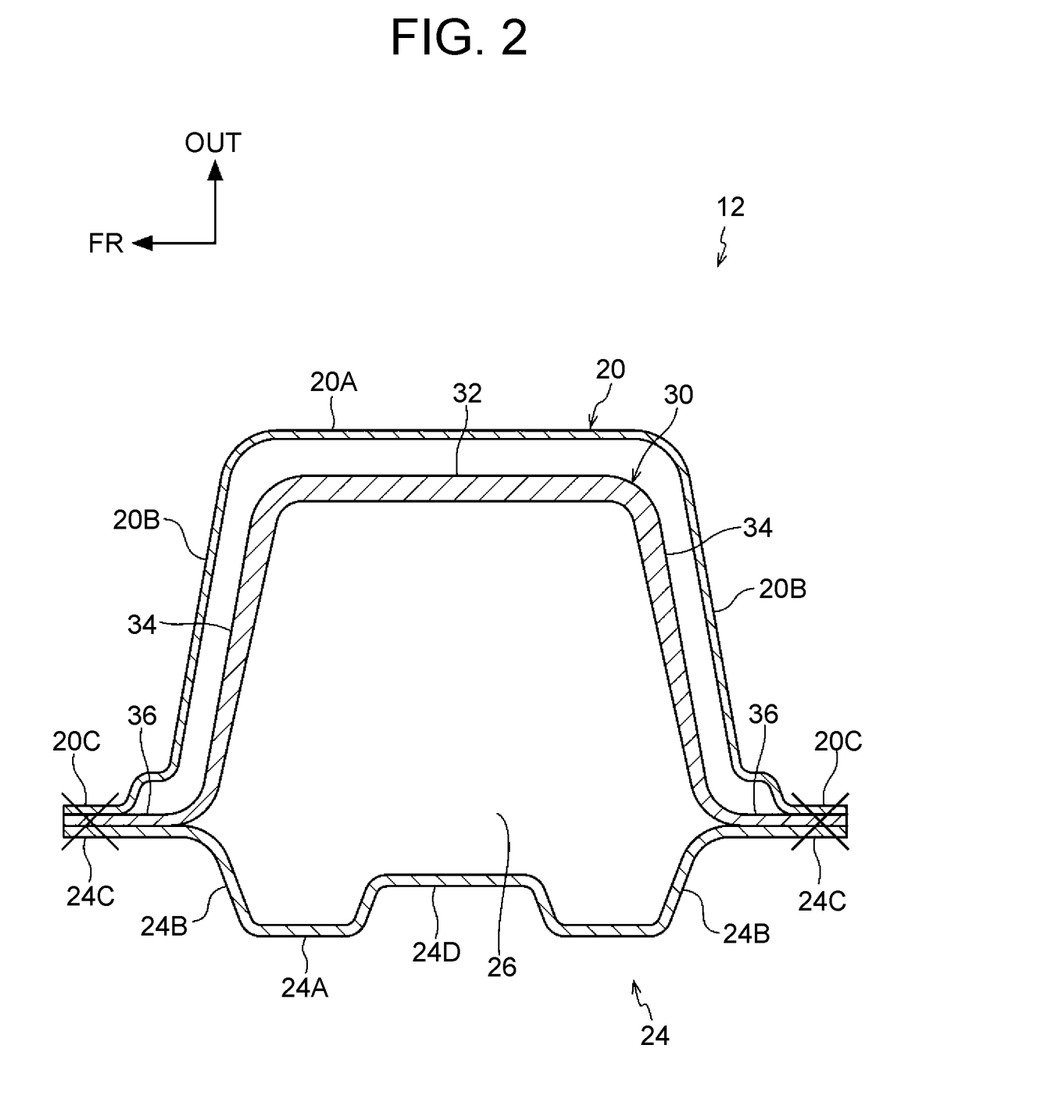
FIG. 2 is a cross sectional view of the center pillar according to the first embodiment, taken along line II-II of FIG. 3.

As shown in FIG. 2, each center pillar 12 includes: an outer panel 20 disposed at an outward position in the vehicle-width direction; an pillar inner panel 24 disposed at a more inward position in the vehicle-width direction than the outer panel 20; and an outer reinforcement 30 (hereinafter, referred to as an "outer R/F30") disposed between the outer panel 20 and the pillar inner panel 24.

The outer panel 20 is formed into a hat shape whose cross section slightly opens, and opens inward in the vehicle-width direction. The outer panel 20 includes a base portion 20A, longitudinal wall portions 20B, and a flange portion 20C. The base portion 20A composes an intermediate portion in the longitudinal direction of the outer panel 20, and is formed into a plate-like shape extending in the front-rear direction of the vehicle so as to compose outside sheathing of the vehicle 10. A pair of longitudinal wall portions 20B extends from respective ends in the front-rear direction of the vehicle of the base portion 20A to an inward direction in the vehicle-width direction. The pair of longitudinal wall portions 20B is inclined relative to the vehicle-width direction such that a distance therebetween becomes gradually increased as they go apart from the base portion 20A. The flange portion 20C extends from each inner end in the vehicle-width direction of each longitudinal wall portion 20B in the front-rear direction of the vehicle. As one example, the outer panel 20 is formed by a normal steel plate.

The pillar inner panel 24 opens outward in the vehicle-width direction, and includes a base portion 24A, a longitudinal wall portion 24B, and a flange portion 24C. The base portion 24A composes an intermediate portion of the pillar inner panel 24, and an intermediate portion in the longitudinal direction of the base portion 24A is formed with a projection 24D projecting outward in the vehicle-width direction. The pair of longitudinal wall portions 24B extends from both ends in the front-rear direction of the vehicle of the base portion 24A to the outward direction in the vehicle-width direction. The pair of longitudinal wall portions 24B is inclined relative to the vehicle-width direction such that a distance therebetween becomes gradually greater as they go apart from the base portion 24A. The flange portion 24C protrudes from the outer ends in the vehicle-width direction of the longitudinal wall portions 24B toward the front-rear direction of the vehicle. The pillar inner panel 24 is formed of a normal steel plate, as one example.

The outer R/F30 is formed into a hat shape whose cross section slightly opens, and opens inward in the vehicle-width direction. The outer R/F30 includes an outer portion 32, coupling portions 34, and a flange portion 36. The outer portion 32 composes an intermediate portion in the longitudinal direction of the outer R/F30, and is arranged along the front-rear direction of the vehicle. A pair of coupling portions 34 extends from both ends in the front-rear direction of the vehicle of the outer portion 32 toward an inward direction in the vehicle-width direction. The pair of coupling portions 34 is inclined relative to the vehicle-width direction such that a distance therebetween becomes gradually greater as they go apart from the outer portion 32. Each of the coupling portions 34 in pair is formed into a flat shape. Here, the flat shape denotes that there are no recess and projection on the surface of the coupling portion 34. The flange portion 36 protrudes in the front-rear direction of the vehicle from the inner ends in the vehicle-width direction of the coupling portions 34. The pair of coupling portions 34 couples the outer end in the longitudinal direction of the outer portion 32 to the inner end in the longitudinal direction of the flange portion 36. The outer R/F30 is formed by a high-tensile steel plate, as one example. The outer R/F30 is provided such that a thickness of the outer portion 32 is thicker than respective thicknesses of the outer panel 20 and the pillar inner panel 24.

Respective lengths from the front ends to the rear ends in the front-rear direction of the vehicle of the outer panel 20, the pillar inner panel 24, and the outer R/F30 are configured to be substantially the same. In order from the outer side of the vehicle-width direction, the flange portion 20C of the outer panel 20, the flange portion 36 of the outer R/F30, and the flange portion 24C of the pillar inner panel 24 are overlaid with each other, and then are joined to each other through spot-welding. Through this, as viewed in the up-down direction of the vehicle, a closed cross section 26 is formed by the outer R/F30 and the pillar inner panel 24.

Figure 3:
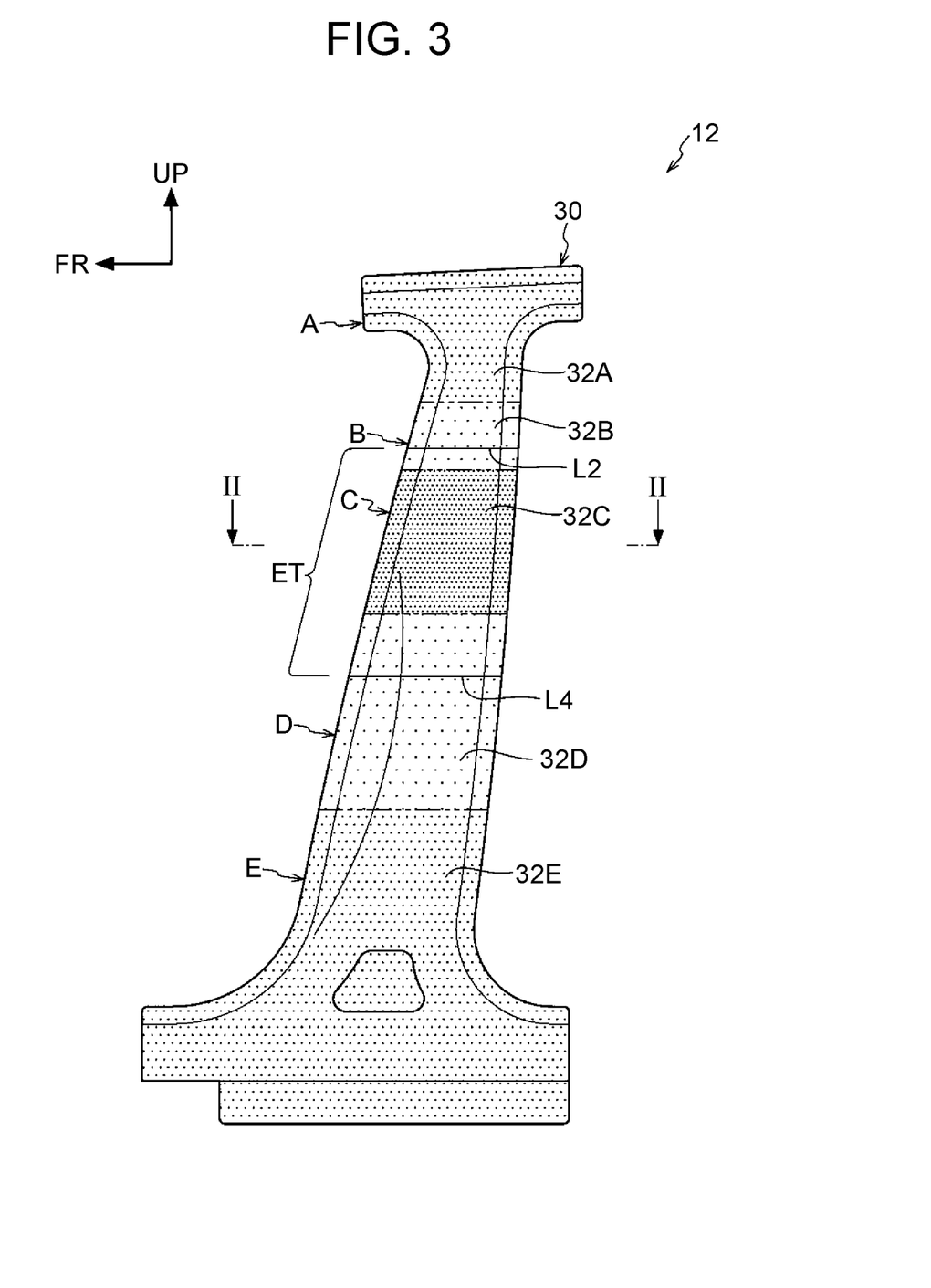
FIG. 3 is a front view of an outer reinforcement of the center pillar according to the first embodiment.

As shown in FIG. 3, the outer R/F30 has a smaller width at the upper position thereof than that at the lower position thereof. The outer R/F30 is composed of a first region A, a second region B, and a third region C, a fourth region D, and a fifth region E in order from top in the vertical direction, and these regions have respective different thicknesses of the outer portion 32. Hereinafter, each outer portion 32 in the first region A to the fifth region E is referred to as the "outer portions 32A to 32E" so as to be distinguished from each other, by adding letters A to E after the reference numeral 32.

A thickness of the outer portion 32A in the first region A is defined as T1, a thickness of the outer portion 32B in the second region B is defined as T2, a thickness of the outer portion 32C in the third region C is defined as T3, a thickness of the outer portion 32D in the fourth region D is defined as T4, and a thickness of the outer portion 32E in the fifth region E is defined as T5. A relation among the thicknesses T1 to T5 is T5<T1≤T4≤T2≤T3. As one example, it may be configured that T5 is approximately 1.6 mm, T1 is approximately 1.8 mm, and T3 is approximately 2.8 mm, respectively. Each of the thickness T2 and the thickness T4 is configured such that a thickness in one adjacent region is gradually changed toward a thickness in the other adjacent region. That is, the outer portion 32B has a gradual increase in thickness from a boundary to the outer portion 32A toward a boundary to the outer portion 32C; and the outer portion 32D has a gradual decrease in thickness from a boundary to the outer portion 32C toward a boundary to the outer portion 32E.

Here, if the outer panel 20 and the pillar inner panel 24 have constant thicknesses, spot-welding is carried out on all the flange portions 20C, 24C, 36 that are stacked, and the joining thereof can readily be carried out through this spot-welding, an upper limit value of the thickness of the flange portion 36 is defined as TH. For example, the thickness TH may be defined to be 2.2 mm. In the present embodiment, the thickness T2D located closer to the third region C than a boundary line L2 of the second region B, the thickness T3 of the third region C, and the thickness T4D located closer to the third region C than the boundary line L4 of the fourth region D are respectively greater than the predetermined thickness TH, and these regions compose a thick-plate region ET.

Figure 4:
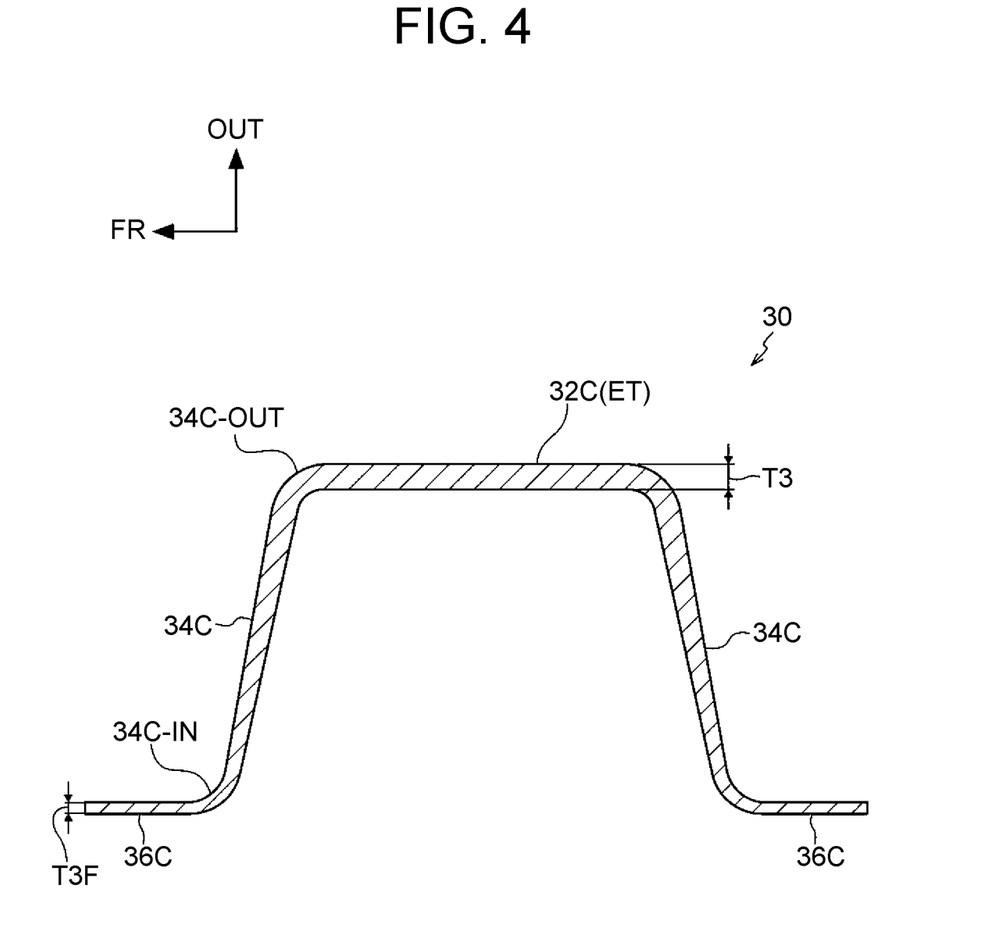
FIG. 4 is a cross sectional view of the outer reinforcement shown in FIG. 2.

FIG. 4 shows a cross sectional view taken along line II-II of the third region C in the thick-plate region ET of the outer R/F 30. The outer portion 32C is defined to be the thickness T3, and this thickness T3 is substantially constant in the longitudinal direction. The thickness T3 of the outer portion 32C is greater than the thickness TH that is the aforementioned upper limit value. The thickness of a flange portion 36C in the third region C is defined to be a thickness T3F. The thickness T3F is defined to be substantially constant in the longitudinal direction.

Each coupling portion 34C in the third region C (plate-thickness gradual change region) has a gradual decrease in thickness from the thickness T3 to the thickness T3F, from one end portion 34C-OUT on the outer portion 32C side to the other end portion 34C-IN on the flange portion 36C side. That is, the thickness of each coupling portion 34C gradually changes in the vehicle-width direction and in the front-rear direction of the vehicle.

The thicknesses of the coupling portions 34B, 34D in the second region B and the fourth region D included in the thick-plate region ET are also gradually changed, as with the third region C.

The outer portion 32A, the coupling portions 34A, and the flange portion 36C in the first region A are configured to have a constant thickness. The outer portion 32E, the coupling portions 34E, and the flange portion 36E in the fifth region E are also configured to have a constant thickness.

If being formed to be metallic, the outer R/F 30 of the present embodiment having the regions (the first region A to the fifth region E) whose thicknesses are different can be produced by using the following producing method of a differential-thickness metallic plate.

Figure 5:
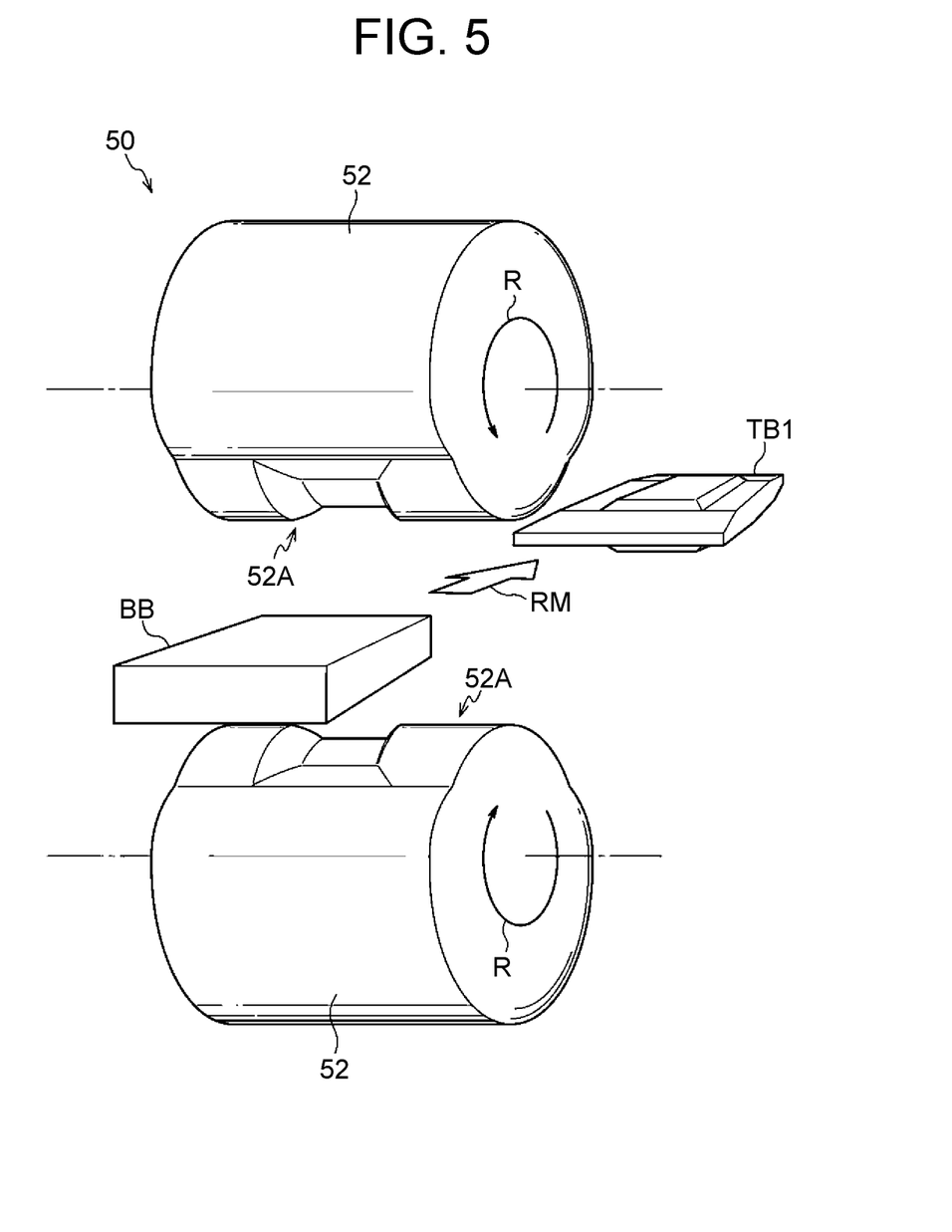
FIG. 5 is a perspective view explaining a rolling step in a producing method of a differential-thickness metallic plate (a tailored blank)
Figure 6:
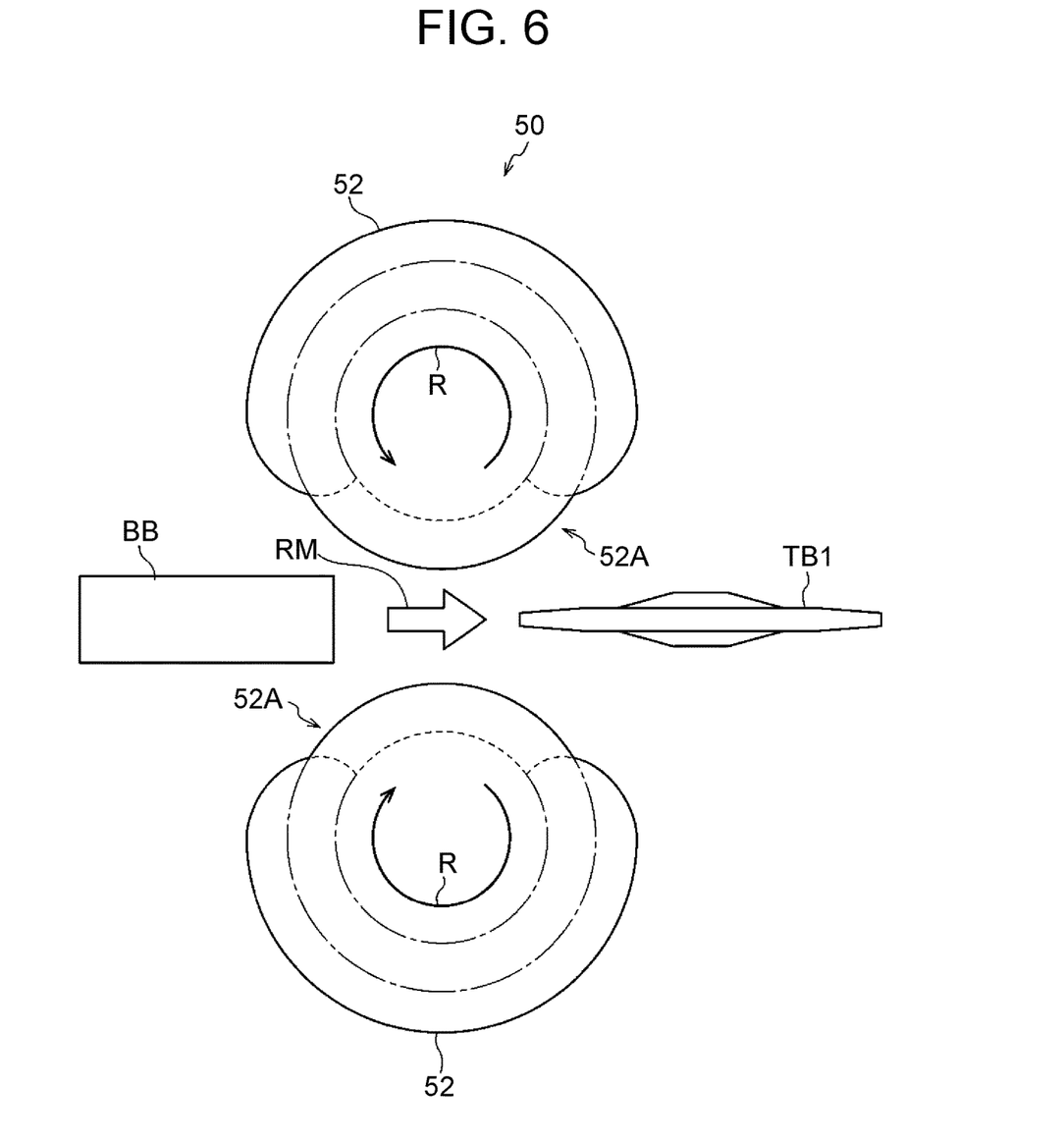
FIG. 6 is a side view explaining the rolling step.

First, in a cutting step, a steel sheet (metallic sheet) having a constant plate thickness is cut into a predetermined shape (a shape that can cover an outer shape of the center pillar 12 before the rolling step) by means such as pressing or the like so as to produce a blank material (plate to be rolled) BB shown in FIG. 5 and FIG. 6.

Next, in the rolling step, the blank material BB is rolled by a rolling machine into a tailored blank TB1 (see FIG. 5 and FIG. 6). In this rolling step, the blank material BB is rolled by one (a single) rolling machine 50 so as to produce the tailored blank TB1. This rolling machine 50 is a two-step rolling machine, and includes a pair of substantially columnar work rolls 52 arranged in two stories in the vertical direction in parallel to each other. These work rolls 52 are configured to be rotatably supported by a not-illustrated housing, and to be rotatably driven in synchronization with each other by a not-illustrated driving unit. A specific gap (a gap smaller than the plate thickness of the blank material BB) is provided between the pair of work rolls 52. In FIG. 5 and FIG. 6, for convenience of explanation, the work rolls 52 in pair are illustrated to be farther apart from each other than actual.

As shown in FIG. 5 and FIG. 6, an outer circumferential surface (working surface) of each of the pair of work rolls 52 is formed with a recessed portion (forming surface) 52A for applying a plate-thickness change (a differential thickness shape) to the blank material BB. This recessed portion 52A is formed into a shape corresponding to a target shape of the tailored blank TB1 to be produced in the rolling step. This target shape is defined to be a shape corresponding to the plate-thickness change (the differential thickness shape) required for the center pillar 12 to be produced by using the tailored blank TB1. In the present embodiment, the above target shape includes the differential thickness shape formed in the first region A to the fifth region E of the center pillar 12 and the shape whose thickness is gradually changed from the thick-plate region ET to the flange portion 36. In FIG. 5 and FIG. 6, the shape of the recessed portion 52A is illustrated in a simple manner for convenience of explanation, and thus this shape is illustrated to be different from the differential thickness shape actually required for the center pillar 12.

The above recessed portion 52A is formed in a circumferential part of each outer circumferential surface of the pair of work rolls 52. Hence, each work roll 52 has a radius in a circumferential region where the recessed portion 52A is provided, which is more reduced than a radius in a circumferential region where the recessed portion 52A is not provided. The recessed portion 52A has a deeper depth at an axial center of each work roll 52, and the radius of each work roll 52 is further reduced in this deeper recessed region. Through this, each work roll 52 is configured to have change in radius in both the circumferential direction and the axial direction. These work rolls 52 are configured to be rotatably driven in synchronization with each other in a manner as to maintain the vertically symmetrical rotating posture all the time (see arrows R in FIG. 5 and FIG. 6).

In the rolling step using the above-configured rolling machine 50, the blank material BB is inserted and rolled between the pair of work rolls 52 of the rolling machine 50 (see arrows RM in FIG. 5 and FIG. 6) so as to transfer the shapes on the working surfaces of the pair of work rolls 52 onto the blank material BB. Through this, the tailored blank TB1 (see FIG. 5 and FIG. 6) whose plate thickness is changed in two different directions orthogonal to the plate-thickness direction.

In the above description, it is configured that the shape of each working surface of the pair of work rolls 52 is defined to be the tailored blank TB1 whose plate thickness is changed in two different directions orthogonal to the plate-thickness direction, but it may be configured that the blank material BB is sequentially rolled by multiple rolling machines so as to produce the tailored blank TB1. For example, if three rolling machines are used, it may be configured that each rolling machine has a different shape of the recessed portion of each work roll, the blank material BB is inserted and rolled between the respective work rolls of the first machine, the second machine, and the third machine in order so as to transfer three different shapes onto the blank material BB, to thereby obtain a shape corresponding to the plate-thickness change (the differential thickness shape) required for the center pillar 12.

After the above rolling step, the tailored blank TB1 is subjected to bending in a pressing step so as to be formed into a predetermined shape. However, in this tailored blank TB1, work hardening is caused to portions having been rolled, and thus it becomes difficult, as it is, to carry out a subsequent deformation processing. Hence, in the present embodiment, the tailored blank TB1 after the rolling step is subjected to heat treatment.

Specifically, for example, the pressing step after the rolling step is a hot-pressing step. In this hot-pressing step, before pressing, the tailored blank TB1 is heated up to a predetermined temperature by means such as high frequency dielectric heating, for example. During this heating, work hardening due to the rolling (the differential-thickness working) is removed.

For example, if the pressing step after the rolling step is set to be a cold-pressing step, an annealing step to anneal the tailored blanks TB1, TB2 is added before the cold-pressing step. In this annealing step, the above work hardening is removed. In this manner, although the number of steps is increased if the annealing step is added, it is possible to use these tailored blanks as normal cold pressing components.

Next, operation and effects of the center pillar 12 of the first embodiment will be described.

Figure 7:
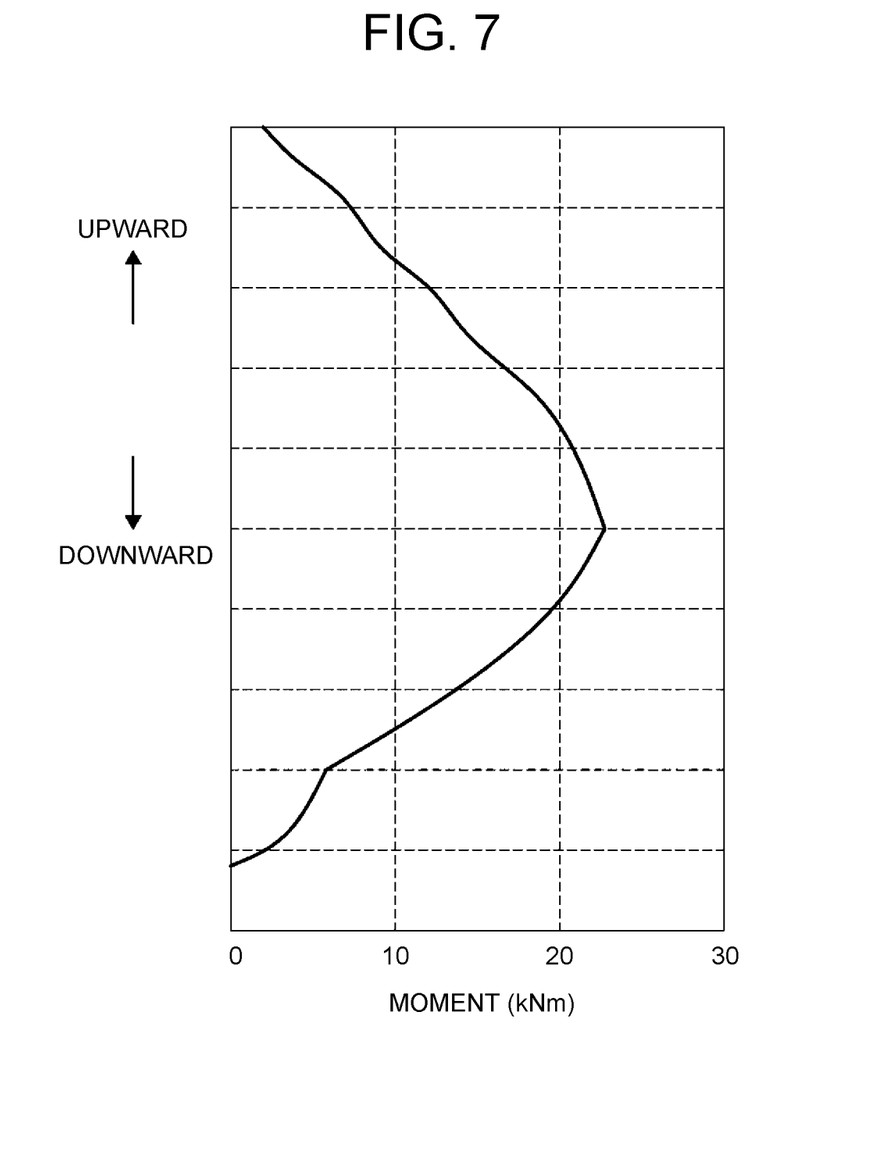
FIG. 7 is a graph showing a relation between a vertical position of the center pillar and a moment at the time of a side collision of a movable deformable barrier.

FIG. 7 shows a relation between a vertical position of the center pillar 12 and a moment at the time of a side collision of a movable deformable barrier. Since a high moment acts on the intermediate portion in the vertical direction of the center pillar 12, this portion is required to have a greater strength.

In the center pillar 12 of the present embodiment, the thick-plate region ET is disposed to the intermediate portion in the vertical direction, and in the thick-plate region ET, the outer portion 32 has a thicker thickness and a greater strength than those of the other portions; therefore, it is possible to suppress deformation of the center pillar 12 toward the vehicle interior.

Since the thickness of the flange portion 36 is defined to be not more than the thickness TH also in the thick-plate region ET, it is possible to easily join the pillar inner panel 24, the outer R/F30, and the outer panel 20 to each other through spot-welding in a state in which they are stacked.

In the other portions than the outer portion 32 in the thick-plate region ET that secures the strength, the outer R/F30 has a thinner thickness, to thus promote weight reduction of the outer R/F30.

In the thick-plate region ET of the outer R/F30, the thicknesses of the coupling portions 34 are gradually changed. In this manner, by moderating the displacement of the coupling portions 34, it is possible to suppress stress concentration at the time of a collision.

In the thick-plate region ET of the outer R/F30, the thickness of the flange portion 36 is constant. Accordingly, it is possible to readily adjust heat input at the time of welding.

The outer R/F30 is formed by a high-tensile steel plate, it is possible to readily produce the outer R/F30 by using the blank material.

In the present embodiment, the outer panel 20 is disposed outward in the vehicle-width direction of the outer R/F30, but the outer panel 20 may be omitted. In this case, the outer R/F30 composes the outside sheathing of the vehicle.

Second Embodiment

Next, the second embodiment of the present disclosure will be described. In the present embodiment, the shape of the thick-plate region ET of the outer R/F30 is different from that in the first embodiment.

Figure 8:
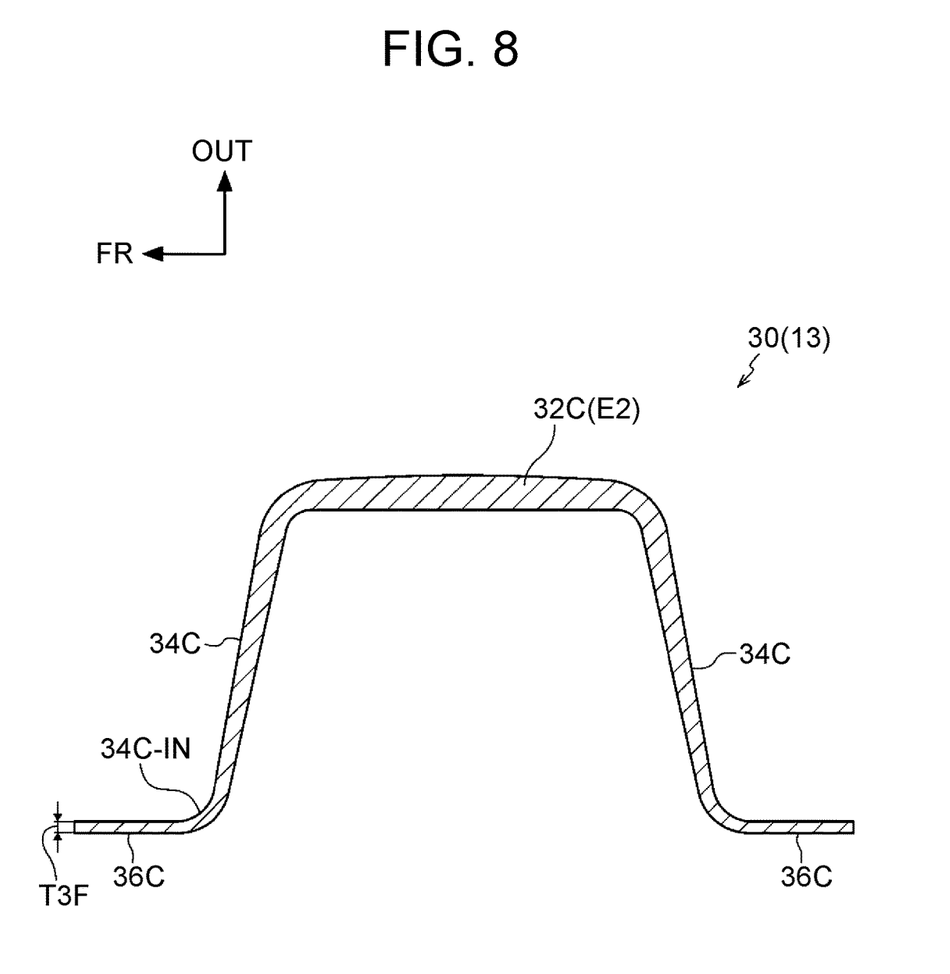
FIG. 8 is a cross sectional view of an outer reinforcement of the center pillar according to the second embodiment.

As shown in FIG. 8, in a center pillar 40 of the present embodiment, the shape of the outer portion 32 in the region (hereinafter, referred to as a "second plate-thickness gradual change region E2") corresponding to the thick-plate region ET of the outer R/F30 is different from that of the first embodiment. In the second plate-thickness gradual change region E2 of the outer R/F30, the thickness in the front-rear direction of the vehicle of the outer portion 32 becomes the thickest, and the thickness thereof becomes gradually reduced toward the frontward direction and the rearward direction. An average plate thickness of the outer portion 32 in the second plate-thickness gradual change region E2 is defined as T3. In the outer portion 32 in the second plate-thickness gradual change region E2, the plate thicknesses at the both longitudinal ends are thicker than the thickness TH.

In the center pillar 40 of the present embodiment, the second plate-thickness gradual change region E2 is disposed to the intermediate portion in the vertical direction, and in the second plate-thickness gradual change region E2, the outer portion 32 has a thicker thickness and a greater strength than those in the other portions, and thus it is possible to suppress deformation of the center pillar 12 toward the vehicle interior.

In the meantime, also in the second plate-thickness gradual change region E2, the thickness of the flange portion 36 is defined to be not more than the thickness TH; therefore, it is possible to readily join the pillar inner panel 24, the outer R/F30, and the outer panel 20 to each other through spot-welding while they are stacked.

In the first and the second embodiments, the plate thicknesses of the coupling portions 34 are changed, but only the plate thickness of the outer portion 32 may be changed, or both the plate thicknesses of the coupling portions 34 and the plate thickness of the outer portion 32 may be changed.

The first and the second embodiments have been described by exemplifying the center pillar, but the present disclosure may be applied to other pillars than the center pillar, such as front pillars and rear pillars.

What is claimed is:

1. A pillar structure comprising:
   a pillar inner panel extending in an up-down direction of a vehicle at a side part of the vehicle; and
   an outer reinforcement including a flange portion located at a more vehicle-outward position than the pillar inner panel in a vehicle-width direction, an outer portion located at a more vehicle-outward position than the flange portion, and a coupling portion coupling the flange portion to the outer portion, the flange portion being welded to the pillar inner panel, the outer portion having a thicknesses that varies in the up-down direction of the vehicle, the outer reinforcement forming a closed cross section with the pillar inner panel, wherein
   between a thick-plate region where a thickness of the outer portion is more than a predetermined thickness and the flange portion, the outer reinforcement has a plate-thickness gradual change region where a thickness of the outer reinforcement gradually changes in a front-rear direction of the vehicle such that a thickness of the flange portion becomes equal to or less than a thickness of the thick-plate region.

2. The pillar structure according to claim 1, wherein the coupling portion is flat and includes the plate-thickness gradual change region where a thickness of the coupling portion gradually decreases from a first end of the coupling portion on a side of the outer portion toward a second end of the coupling portion on a side the flange portion.

3. The pillar structure according to claim 1, wherein the thickness of the flange portion is constant in the front-rear direction of the vehicle.

4. The pillar structure according to claim 1, wherein the outer reinforcement is composed of a single high tensile steel plate.

5. The pillar structure according to claim 1, wherein the thick-plate region includes a center of the outer reinforcement in the up-down direction of the vehicle.

6. The pillar structure according to claim 1, wherein the outer portion has a second plate-thickness gradual change region where the thickness of the outer reinforcement gradually changes in the front-rear direction of the vehicle.

* * * * *

UNITED STATES PATENT AND TRADEMARK OFFICE
CERTIFICATE OF CORRECTION

PATENT NO. : 10,336,375 B2
APPLICATION NO. : 15/837394
DATED : July 2, 2019
INVENTOR(S) : Yoshiaki Nakamoto et al.

Page 1 of 1

It is certified that error appears in the above-identified patent and that said Letters Patent is hereby corrected as shown below:

On the Title Page

Column 1, Item (30) should read:
Foreign Application Priority Data
Dec. 19, 2016 (JP)............................................... 2016-246052

Signed and Sealed this
Tenth Day of September, 2019

Andrei Iancu
*Director of the United States Patent and Trademark Office*